United States Patent
Kota et al.

(10) Patent No.: US 10,474,696 B2
(45) Date of Patent: Nov. 12, 2019

(54) REPLICATION GROUPS FOR CONTENT LIBRARIES

(71) Applicant: VMware, Inc., Palo Alto, CA (US)

(72) Inventors: Preeti Kota, Sunnyvale, CA (US); James Chang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 268 days.

(21) Appl. No.: 15/193,154

(22) Filed: Jun. 27, 2016

(65) Prior Publication Data
US 2017/0371946 A1    Dec. 28, 2017

(51) Int. Cl.
*G06F 16/27*   (2019.01)
*H04L 29/08*   (2006.01)
*G06F 9/455*   (2018.01)

(52) U.S. Cl.
CPC ........ *G06F 16/275* (2019.01); *H04L 67/1095* (2013.01); *H04L 67/1097* (2013.01); *G06F 9/45533* (2013.01)

(58) Field of Classification Search
CPC ........... G06F 17/30581; G06F 9/45533; G06F 16/275; H04L 67/1095; H04L 67/1097
See application file for complete search history.

(56) References Cited

U.S. PATENT DOCUMENTS

| | | | |
|---|---|---|---|
| 2007/0220067 A1* | 9/2007 | Suriyanarayanan | G06F 17/30174 |
| 2011/0055933 A1* | 3/2011 | Ishiguro | G06F 21/10 726/27 |
| 2012/0023066 A1* | 1/2012 | Bourbonnais | G06F 17/30566 707/613 |
| 2014/0040286 A1* | 2/2014 | Bane | G06F 17/30253 707/754 |

OTHER PUBLICATIONS

WMware, Using vCloud Connector 2.7, released Nov. 13, 2014. (Year: 2014).*

* cited by examiner

*Primary Examiner* — Jay A Morrison
(74) *Attorney, Agent, or Firm* — Loza & Loza, LLP

(57) ABSTRACT

A distributed computer system and method for synchronizing content libraries in replication groups uses a synchronization control signal that is transmitted to a subscribed content library management module of each subscribed content library in a replication group from a content library management module of the master content library in the replication group to initiate a synchronization procedure. Using metadata of at least one consumable software item from the master content library, contents of a subscribed content library in the replication group are modified to synchronize its contents to the contents of the master content library.

21 Claims, 11 Drawing Sheets

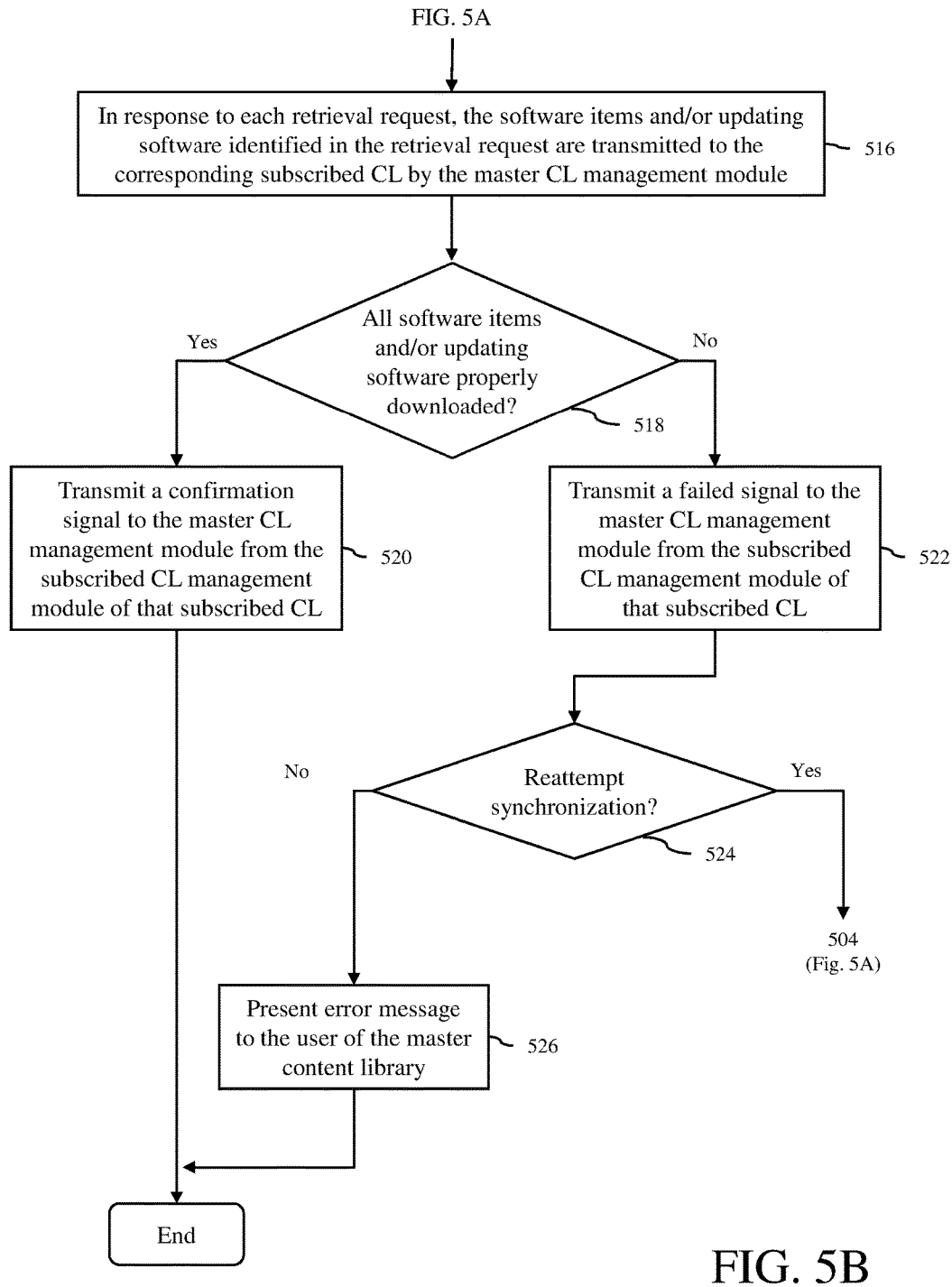

REPLICATION GROUPS FOR CONTENT LIBRARIES

BACKGROUND

Virtualization allows computer resources, such as processors, computer memories, network bandwidth and data storage facilities, to be shared among resource-consuming processing entities, e.g., virtual machines (VMs), running on a distributed computer system. This sharing of computer resources can increase efficiency by reducing maintenance and operating costs, allowing flexibility with respect to individual resource usage, and simplifying resource management. With respect to shared storage, the benefits include data consolidation, universal access to data, ease of storage management, and support for live migration of virtualized environments.

The resource-consuming processing entities can be used to form virtual data centers and other processing clusters to perform various tasks and operations. Administrators and users of these data centers and processing clusters need to efficiently manage different aspects of the data centers and processing clusters, which may involve using consumable software contents, such as virtual machine and application templates. Typically, these consumable software contents are stored in local or remote datastores that can be accessed to anyone with administrative rights to the data centers or processing clusters and their datastores. This presents a security issue since anyone with access to a data center or processing cluster and its datastore can also freely access the consumable software contents stored in the datastore, and, for example, initiate unauthorized build of resource-consuming processing entities using the consumable software contents. In addition, sharing these consumable software contents between different administrators and users can be tedious and time-consuming since the consumable software contents may be stored in numerous datastores located in different regions or locations.

SUMMARY

A distributed computer system and method for synchronizing content libraries in replication groups uses a synchronization control signal that is transmitted to a subscribed content library management module of each subscribed content library in a replication group from a content library management module of the master content library in the replication group to initiate a synchronization procedure. Using metadata of at least one consumable software item from the master content library, contents of a subscribed content library in the replication group are modified to synchronize its contents to the contents of the master content library. For each subscribed content library in the replication group, a confirmation message is transmitted to the content library management module of the master content library from the subscribed content library management module of that subscribed content library when the contents of that subscribed content library have been synchronized.

A method for synchronizing content libraries in replication groups within a distributed computer system in accordance with an embodiment of the invention comprises defining a replication group of content libraries, the replication group including a master content library and at least one subscribed content library, modifying contents of the master content library, the master content library including at least one consumable software item and metadata of the at least one consumable software item, transmitting a synchronization control signal to a subscribed content library management module of each subscribed content library in the replication group from a content library management module of the master content library to initiate a synchronization procedure, after receipt of the synchronization control signal, receiving the metadata of the at least one consumable software item from the master content library at each subscribed content library in the replication group, for each subscribed content library in the replication group, analyzing the metadata of the at least one consumable software item from the master content library to determine any content differences between the master content library and that subscribed content library, and modifying contents of the at least one subscribed content library in accordance with the content differences between the master content library and that subscribed content library to synchronize the contents of that subscribed content library to the contents of the master content library. In some embodiments, the steps of this method are performed when program instructions contained in a computer-readable storage medium are executed by one or more processors.

A distributed computer system in accordance with an embodiment of the invention comprises memory and a processor that is configured to define a replication group of content libraries, the replication group including a master content library and at least one subscribed content library, modify contents of the master content library, the master content library including at least one consumable software item and metadata of the at least one consumable software item, transmit a synchronization control signal to a subscribed content library management module of each subscribed content library in the replication group from a content library management module of the master content library to initiate a synchronization procedure, after receipt of the synchronization control signal, receive the metadata of the at least one consumable software item from the master content library at each subscribed content library in the replication group, for each subscribed content library in the replication group, analyze the metadata of the at least one consumable software item from the master content library to determine any content differences between the master content library and that subscribed content library, and modify contents of the at least one subscribed content library in accordance with the content differences between the master content library and that subscribed content library to synchronize the contents of that subscribed content library to the contents of the master content library.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIGS. 5A and 5B is a flow diagram of a "push" synchronization process for one or more content libraries that are subscribed to a master content library and belong to the replication group of the master content library in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
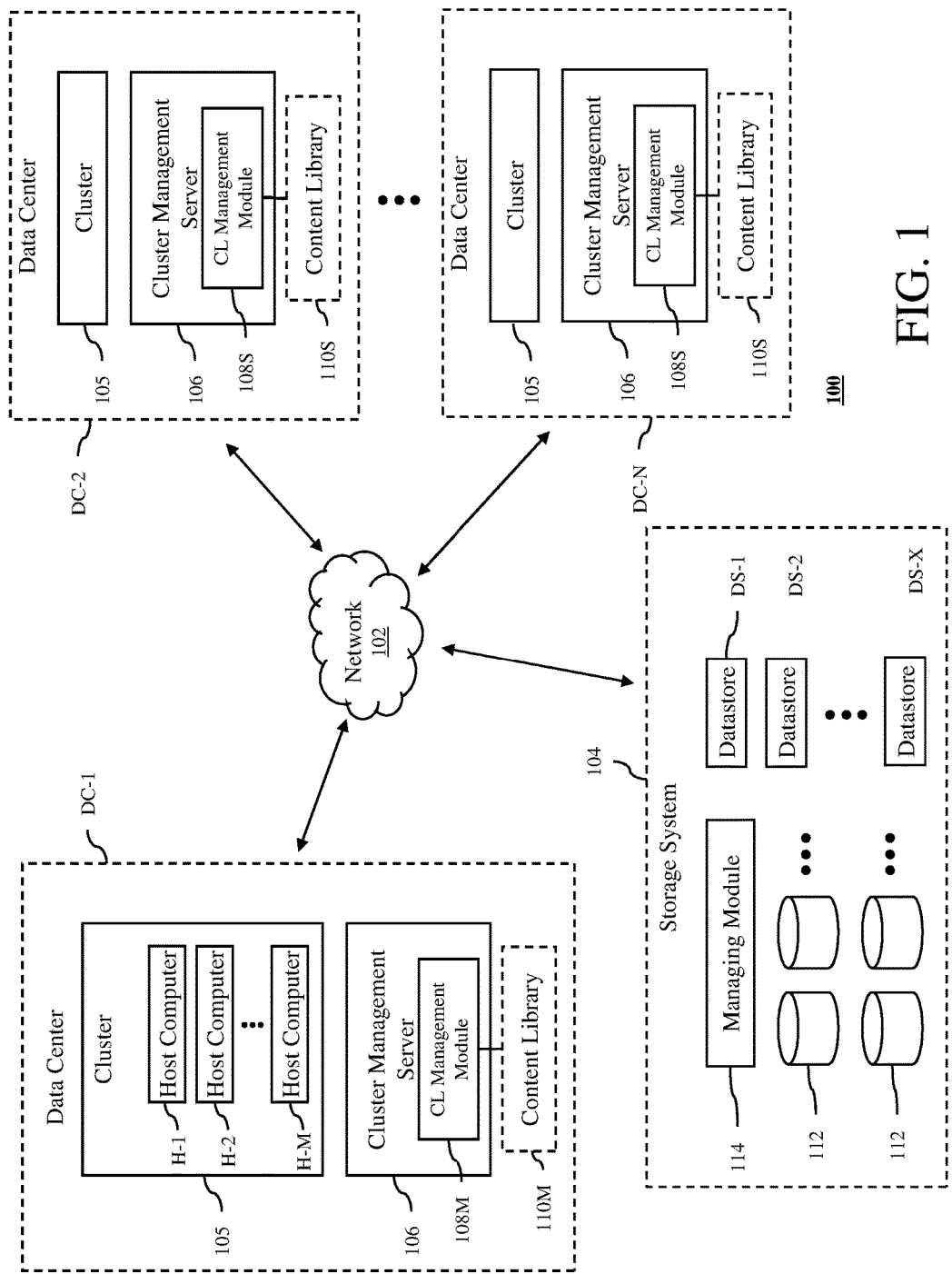
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, data centers DC-1, DC-2 . . . DC-N (where N is a positive integer) and a storage system 104. Each data center includes a cluster 105 of host computers and a cluster management server 106. The clusters of host computers in the different data centers are used to support or host multiple processing entities that can execute various applications. As used herein, the term "processing entity" is any software entity that can run on a computer system, such as a software application, a software process, a virtual machine (VM) and a "container" that provides system-level process isolation. Although each data center is shown in FIG. 1 as having one cluster with a cluster management server, these data centers may include multiple clusters and/or cluster management servers. The host computers of the different clusters may be connected to the storage system 104 via the network 102. Thus, each of the host computers in the clusters is able to access the storage system via the network and may share the resources provided by the storage system. Consequently, any process running on any of the host computers in the distributed computer system may also access the storage system via the network. In some embodiments, one or more of the data centers may include its own storage system, similar to the storage system 104.

In the illustrated embodiment, each of the clusters 105 in the data centers DC-1, DC-2 . . . DC-N includes a number of host computers H-1, H-2 . . . H-M (where M is a positive integer) and a cluster management server 106. The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have a different number of host computers. The host computers may be physical or virtual computer systems that host or support one or more processing entities so that the processing entities are executing on the physical or virtual computer systems. The host computers may be servers that are commonly found in data centers. As an example, the host computers may be servers installed in one or more server racks. In an embodiment, the host computers of a cluster are located within the same server rack.

Figure 2:
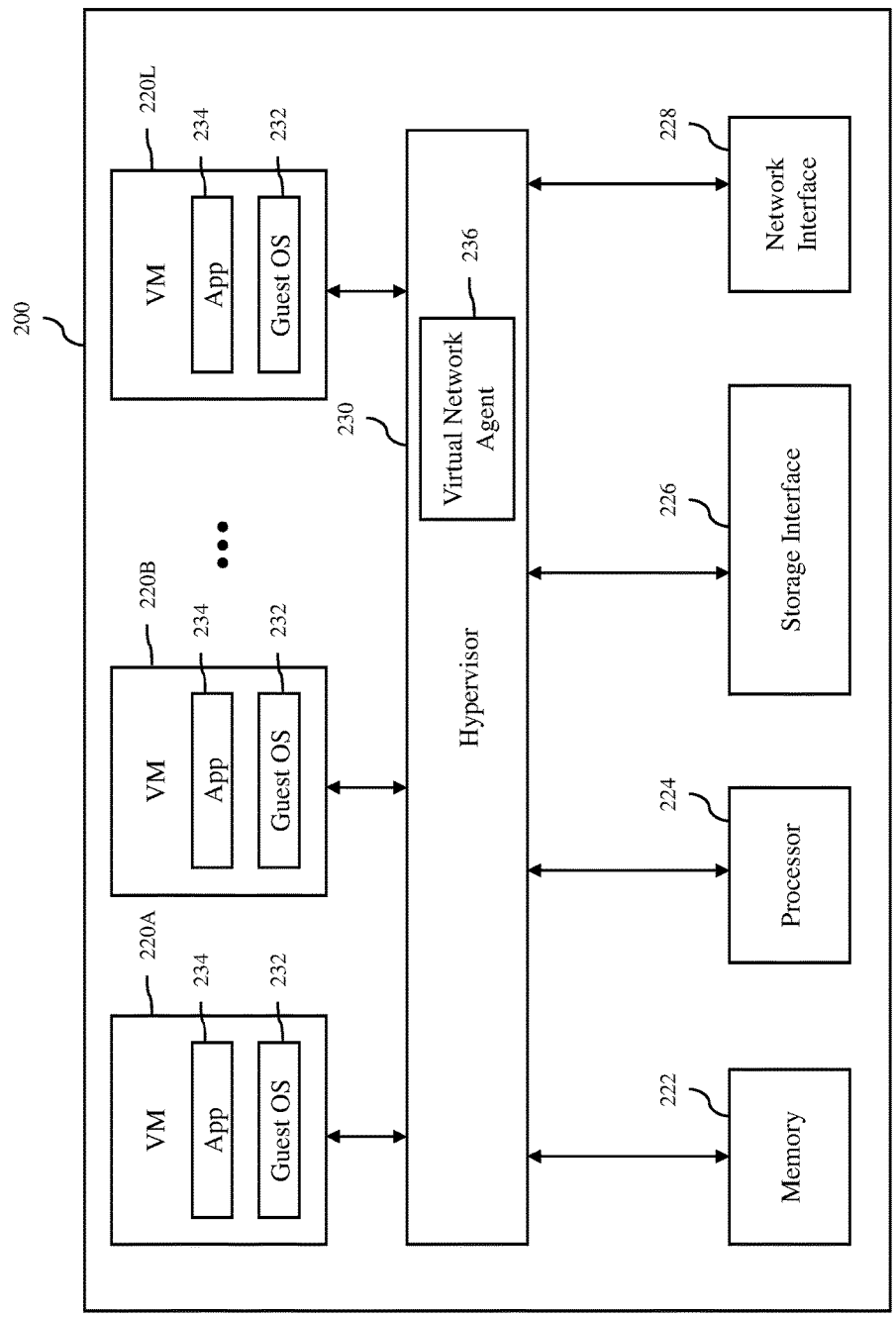
FIG. 2 is a block diagram of a host computer in accordance with an embodiment of the invention.

Turning now to FIG. 2, components of a host computer 200 that is representative of the host computers H-1, H-2 . . . H-M in the clusters 105 in accordance with an embodiment of the invention are shown. In FIG. 2, the physical connections between the various components of the host computer are not illustrated. In the illustrated embodiment, the host computer is configured to support a number of processing entities 220A, 220B . . . 220L (where L is a positive integer), which are VMs in this embodiment. The number of VMs supported by the host computer can be anywhere from one to more than a hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide virtualized computer systems that give the appearance of being distinct from the host computer and from each other. Each VM includes a guest operating system (OS) 232 and one or more guest applications (APP) 234. The guest operating system manages virtual system resources made available to the corresponding VM by the hypervisor 230, and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 may include a virtual network agent 236, which operates within the hypervisor 230 to provide virtual networking capabilities, such as bridging, L3 routing, L2 switching and firewall capabilities, so that software defined networks or virtual networks can be created. In a particular embodiment, the virtual network agent 236 may be part of a VMware NSX™ virtual network product installed in the distributed computer system 100.

Turning back to FIG. 1, each of the cluster management servers 106 in the data centers DC-1, DC-2 . . . DC-N operates to monitor and manage the host computers H-1, H-2 . . . H-M in the respective cluster. Each cluster management server may be configured to monitor the current configurations of the host computers and the processing entities, e.g., VMs, running on the host computers in the respective cluster. The monitored configurations may include hardware configuration of each of the host computers, such as CPU type and memory size, and/or software configurations of each of the host computers, such as operating system (OS) type and installed applications or software programs. The monitored configurations may also include processing entity hosting information, i.e., which processing entities are hosted or running on which host computers. The monitored configurations may also include processing entity information. The processing entity information may include size of each of the processing entities, virtualized hardware configuration of each of the processing entities, such as virtual CPU type and virtual memory size, software configuration of each of the processing entities, such as OS type and installed applications or software programs running on each of the processing entities, and virtual storage size for each of the processing entities. The processing entity information may also include resource parameter settings, such as demand, limit, reservation and share values for various resources, e.g., CPU, memory, network bandwidth and storage, which are consumed by the processing entities. The "demand," or current usage, of the processing entities for the consumable resources, such as CPU, memory, network, and storage, are measured by the host computers hosting the processing entities and provided to the respective cluster management server.

In some embodiments, the cluster management servers 106 may be physical computers with each computer including at least memory and one or more processors, similar to the host computer 200. In other embodiments, the cluster management servers may be implemented as software programs running on physical computers, such as the host computer 200 shown in FIG. 2, or virtual computers, such as the VMs 220A, 220B . . . 220L. In an implementation, the cluster management servers are VMware® vCenter™ servers with at least some of the features available for such servers.

In the illustrated embodiment, the cluster management server 106 in the data center DC-1 includes a content library (CL) management module 108M, which has been programmed or configured as a master content library management module, and each of the cluster management servers 106 in the other data centers DC-2 . . . DC-N includes a CL management module 108S, which has been programmed or configured as a subscribed content library management module. The master CL management module is configured to create and manage a master content library 110M, while each of the subscribed CL management module is configured to create and manage a subscribed content library 110S. A content library is a repository for consumable software items, such as virtual machine (VM) templates and virtual application (vApp) templates, as well as other software items, such as ISO files, scripts and text files, for example. A VM template is a master image of a virtual machine that can be used to create new virtual machines. This image typically includes an operating system, applications and configuration settings for the virtual machine. A vApp template is an image of multiple VMs that is loaded with an operating system, applications and data. The vApp templates ensure that virtual machines are consistently configured across an entire organization. Thus, consumable software items can be software items that are used to clone processing entities, convert processing entities to consumable items or deploy processing entities.

A content library may be configured or programmed to be a master content library, such as the master content library 110M, or a subscribed content library, such as one of the subscribed content libraries 110S. A master content library functions as a source of software items for other content libraries that are subscribed to the master content library, i.e., subscribed content libraries. A subscribed content library is a content library that allows the users of the subscribed content library to easily access and use the software items of the master content library to which the subscribed content library is subscribed. The use of content libraries in the distributed computer system 100 easily allows users to share and use software items, in particular the consumable software items. The content library management modules 108M and 108S and the content libraries 110M and 110S are further described below.

A single master content library may have one or more subscribed content libraries. The master content library and the subscribed content libraries that are subscribed to that master content library may be part of a replication group, which defines a group of content libraries that will each have the same contents as the master content library in the replication group. In an embodiment, a replication group uses a "push" replication scheme to synchronize the contents of each of the subscribed content libraries with the contents of the master content library. A "push" replication/synchronization scheme allows a user of the master content library to control the synchronization of the contents of each of the subscribed content libraries with the contents of the master content library. In contrast, in a "pull" replication/synchronization scheme, each subscribed content library will download/retrieve contents from the master or publishing content library in order to synchronize the contents of that subscribed content library with the contents of the master content library. However, with a "pull" replication/synchronization scheme, a user of the publishing content library has no control over the subscribed content libraries with respect to synchronization of the subscribed content libraries with the publishing content library. Thus, the user of the publishing content library does not know when and if a subscribed content library has synchronized with the publishing content library. This could be a significant concern if the user of the publishing content library wants to distribute a critical security software patch to users of the subscribed content libraries. The use of a "push" replication/synchronization scheme in replication groups in accordance with embodiments of the invention addresses this concern and may provide other advantages over a "pull" replication/synchronization scheme. The concept of replication groups used in the distributed computer system 100 is described in detail below.

The network 102 of the distributed computer system 100 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage system 104 of the distributed computer system 100 is used to store data for the host computers in the data centers DC-1, DC-2 . . . DC-N, which can be accessed like any other storage device connected to computer systems. In an embodiment, the storage system can be accessed by entities, such as the cluster management servers 106, including their content library management modules 108, and the processing entities running on the host computers, using any file system, e.g., virtual machine file system (VMFS) or network file system (NFS). The storage system 104 includes one or more computer data storage devices 112, which can be any type of storage devices, such as solid-state devices (SSDs), hard disks or a combination of the two. At least some of these storage devices may be local storage devices of the host computers, e.g., locally attached disks or SSDs within the host computers. The storage devices 112 may operate as components of a network-attached storage (NAS) and/or a storage area network (SAN). The storage may include one or more storage managing modules 114, which manage the operation of the storage system. In an embodiment, each storage managing module 114 is a computer program executing on one or more computer systems (not shown) of the storage. The storage system supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage system. The datastores are used to store data associated with the processing entities supported by the host computers of the clusters in the data centers. The same datastore may be associated with more than one cluster. For VMs, the datastores may be used to store virtual storage, e.g., virtual disks, used by each of the VMs, as well as other files needed to support the VMs, such as configuration files for the VMs. In addition, the datastores may be used to store snapshots of processing entities, e.g., VMs, which may include some or all of the files of the processing entities. Furthermore, the datastores may be used to store the content libraries 110M and 110S created and managed by the content library management modules 108M and 108S, as well as the contents of the content libraries. One or more datastores may be associated with one or more host computers. Thus, each host computer is associated with at least one datastore. Some of the datastores may be grouped into one or more clusters of datastores, which are commonly referred to as storage pods. Although the physical components of the storage system are shown together in FIG. 1, some of these physical components may be distributed across large distances.

Turning back to the content library management modules 108M and 108S, each of these content library management modules is configured or programmed to support a content library feature in which at least one content library can be created and maintained for the corresponding cluster management server. In particular, the master content library management module is configured to create and maintain a master content library, such as the master content library 110M. In an embodiment, the master content library management module may be configured to automatically create the master content library when the master content library management module is instantiated or executed. The master content library management module is also configured to define a replication group and assign the master content library to the replication group. In an embodiment, the master content library management module may be configured to automatically create the replication group and automatically assign the master content library to the replication group.

The master content library management module 108M is further configured to allow content libraries created by other content library management modules, e.g., the subscribed content libraries 110S, to subscribe to the master content library 110M. In addition, the master content library management module may be configured to allow one or more of the subscribed content libraries to join the replication group to which the master content library belongs and maintain data related to the replication group, such as identifications of members of the replication group and other information related to the members, e.g., identification of the content library management module that the subscriber belongs to, replication state of the content library and the item (success or failed) and version of the subscriber, which could be a timestamp of the last replication. The data related to the replication group will be referred to herein as "replication group data". In some embodiments, the master content library management module operates to control the synchronization/replication process of the subscribed content libraries in the replication group to synchronize the contents of the subscribed content libraries in the replication group with the contents of the master content library in the replication group. This ensures that critical software items can be provided to the users of the subscribed content libraries of the replication group using the master content library of the replication group.

The master content library 110M may be configured so that a password or other verification is required for other content libraries to subscribe to the master content library. The master content library typically includes one or more software items, which may include consumable software items, metadata of the software items (sometimes referred to herein as "item metadata"), and metadata of the library (sometimes referred to herein as "library metadata"). In an embodiment, the consumable software items may be stored as Open Virtualization Format (OVF) file format. The item metadata includes information regarding the software items, such as identification of the software item, creation date of the software item, software item type, name of library to which the software item belongs, description of the storage item, version of the storage item, file uniform resource locator (URL) of the storage item and storage location of the software item. The library metadata includes information regarding the master content library, such as identification of the content library, name of the content library, description of the content library, tags for the content library, categories for the content library, and any other relevant information regarding the content library. The item and library metadata may be stored as one or more files in the master content library that can be replicated and synchronized at any subscribed content library. In an embodiment, the item and library metadata may be stored as one or more JavaScript Object Notation (JSON) files. However, in other embodiments, the item and library metadata may be stored in the content library in any format or structure. The master content library may also include the replication group data, which includes at least identification of members of the replication group.

Each of the subscribed content library management modules 108S is configured to create and maintain at least one subscribed content library, such as the subscribed content libraries 110S. In an embodiment, each subscribed content library management module may be configured to automatically create one subscribed content library when the subscribed content library management module is instantiated or executed. Each subscribed content library may be subscribed to a master content library so that the contents of that subscribed content library can be synchronized with the contents of the master content library. Each subscribed content library may also be assigned to a replication group so that the contents of that subscribed content library can be synchronized with the contents of the master content library in the replication group.

In an embodiment, application programming interface (API) may be used by a user, e.g., an administrator for the data center DC-1, to communicate to the master content library management module 108M from a user interface, which may be a web application or an application running on a physical or virtual computer. From this single user interface, the user may control various operations related to a replication group, such as (1) create a replication group, (2) create a master content library for the replication group, (3) create a subscribed content library for the replication group, (4) synchronize the contents of the subscribed content libraries of the replication group with the contents of the master content library of the replication group, (5) remove a subscribed content library from the replication group, and (6) delete a subscribed content library from the replication group. In response to the API instructions, the master content library management module performs the necessary operations to execute the requests, which may involve interactions with one or more of the subscribed content library management modules 108S. As an example, in response to a request to add a subscribed content library to a newly created replication, the master content library management module will communicate with the appropriate subscribed content library management module so that the requested subscribed content library gets created.

The following is simplified replication group API that may be used for the master content library management module 108M.

(1) Create a replication group:
ID createReplicationGroup(String name, String description)
Creates a replication group with the provided name and description.
Parameters:
  name: Replication group name.
  description: Replication group description.
Returns:
Replication group ID
(2) Create a master content library:
ID createMasterLibrary(ID replicationGroupId, ID libraryId)
Creates a master library in the replication group. This API creates a master library in the replication group if libraryId is null.
Parameters:
  replicationGroupId: Replication group where the master library should be created.
  libraryId: Adds the existing library as a master in the replication group if provided. The service creates a master library in the replication group if this parameter is null.
Returns:
Master library ID
(3) Create a subscribed content library:
ID createSubscribedLibrary(ID replicationGroupId, URI replicaNodeClsEndpoint,
  List<Storage>storageLocations);
Creates a subscribed library in the Content Library associated with the replicaNodeClsEndpoint. The newly created subscribed library is added to the replication group.
Parameters:
  replicationGroupId: Replication group ID where the replica library should be created
  replicaNodeClsEndpoint: CLS (Content Library as a Service) endpoint where the replica library should be created.
  storageLocations: Storage locations that should be associated with the replica library.
Returns:
Replica library ID
(4) Synchronize a replication group:
void synchronize(ID replicationGroupId);
Synchronizes contents of the master library with all the subscribed libraries in the replication group.
Parameters:
  replicationGroupId: Replication group to synchronize.

Returns:
None (5) Remove a subscribed content library from a replication group:
void removeSubscribedLibrary(ID replicationGroupId, ID subscribedLibraryId); Removes the given subscribed library from the replication group. This operation does not delete the subscribed library.
Parameters:
replicationGroupId: Replication group that the subscribed library belongs to.
subscribedLibraryId: Subscribed library that should be removed from the replication group.
Returns:
None (6) Delete a subscribed library of a replication group:
void deleteSubscribedLibrary(ID replicationGroupId, ID subscribedLibraryId); Deletes the given subscribed library and removes it from the replication group.
Parameters:
replicationGroupId: Replication group that the subscribed library belongs to.
subscribedLibraryId: Subscribed library to delete.
Returns:
None Thus, in some embodiments, the master content library management module of the master content library in a replication group operates to control the synchronization/replication process of the subscribed content libraries in the replication group to synchronize the contents of the subscribed content libraries in the replication group with the contents of the master content library in the replication group. This ensures that critical software items can be provided to the users of the subscribed content libraries of the replication group using the master content library of the replication group.

The synchronization process of a subscribed content library with a master content library involves synchronizing the subscribed content library so that the item and library metadata and all the software items in the master content library are present in the subscribed content library. Typically, the item and library metadata in a master content library is not large in size. For example, the item and library metadata for a master content library may be less than one (1) megabyte in size, such as two (2) Kilobytes. However, the software items in a publishing content library can be significantly large in size. For example, a single consumable software item, such as a VM template, may be larger than one (1) gigabyte in size and may be as large as one (1) terabyte. After a subscribed content library is created, the item and library metadata and all the software items in the master content library are replicated or downloaded to the subscribed content library. After this initial synchronization, subsequent synchronization processes of the subscribed content library to the master content library may be performed to re-synchronize the subscribed content library with the master content library, which may have changes with respect to the item and library metadata and the software items stored in the master content library. This initial synchronization and the subsequent synchronization processes are performed for each content library that is subscribed to the master content library. Thus, all the subscribed content libraries can be synchronized to the same master content library.

In an embodiment, the synchronization process of a subscribed content library can vary depending on whether that subscribed content library and the master content library (to which the subscribed content library is subscribed) belong to the same replication group. If the subscribed content library and the master content library do not belong to the same replication group, the synchronization process of that subscribed content library is a "pull" synchronization process, which is executed at the subscribed content library. If there are other content libraries that are subscribed to the same master content library and do not belong to the replication group of the master content, each of those subscribed content libraries would need to individually execute a synchronization process to synchronize its contents with the master content library. However, if the subscribed content library and the master content library belong to the same replication group, the synchronization process of that subscribed content library is a "push" synchronization process, which is initiated at the master content library. If there are other content libraries that are subscribed to the same master content library and belong to the same replication group of the master content, each of those subscribed content libraries would be synchronized to the master content library as part of the same "push" synchronization process. In some implementations, the subscribed content libraries that belong to the same replication group of the master content library may be allowed to initiate a "pull" synchronization process. The "push" and "pull" synchronization processes for subscribed content libraries are further described below using the following example.

Figure 3:
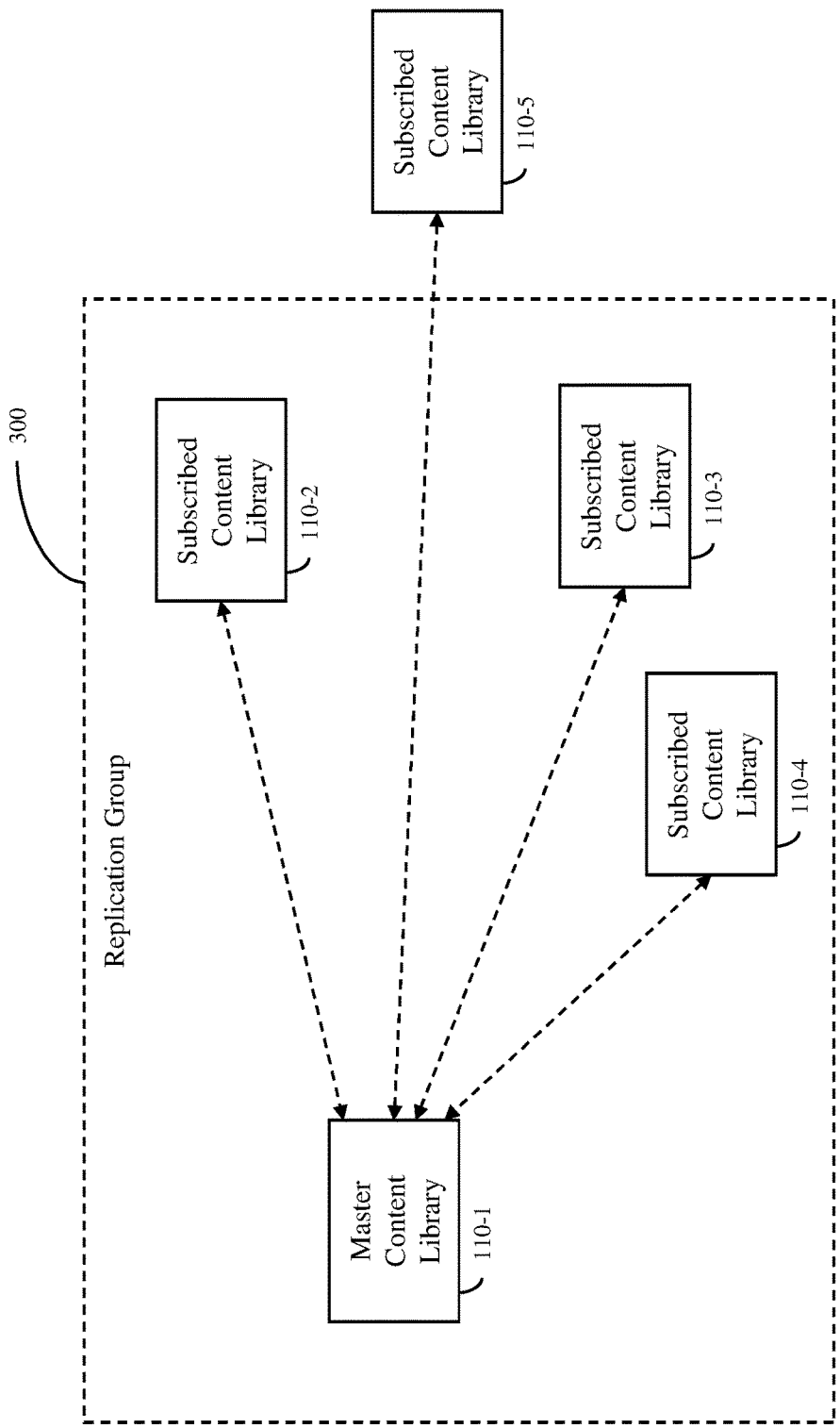
FIG. 3 is an illustration of a replication group with master and subscribed content libraries in accordance with an embodiment of the invention.

Turning now to FIG. 3, an example of a replication group 300 in the distributed computer system is illustrated. In this example, there are five content libraries 110-1, 110-2, 110-3, 110-4 and 110-5. The associated content library management modules of these content libraries that perform operations for the respective content libraries are not illustrated in FIG. 3. It can be assumed that actions of a content library described herein with respect to content synchronization are performed or managed by the content library management module associated with that content library for that content library. In the illustrated example, the content library 110-1 has been configured as a master content library, while the content libraries 110-2, 110-3, 110-4 and 110-5 have been configured to be subscribed to the master content library 110-1. Furthermore, a replication group has been formed that includes the master content library 110-1 and the subscribed content libraries 110-2, 110-3 and 110-4. Thus, the subscribed content library 110-5 does not belong to the replication group.

Since the subscribed content library 110-5 does not belong to the replication group 300 but is subscribed to the master content library 110-1, a "pull" synchronization process needs to be performed to synchronize the contents of the subscribed content library 110-5 with the contents of the master content library 110-1. This synchronization process is initiated by the subscribed content library 110-5 to synchronize its contents with the contents of the master content library 110-1. If there are other content libraries subscribed to the master content library 110-1 and also do not belong to the replication group 300, each of those subscribed content libraries would have to initiate a "pull" synchronization process.

Figure 4:
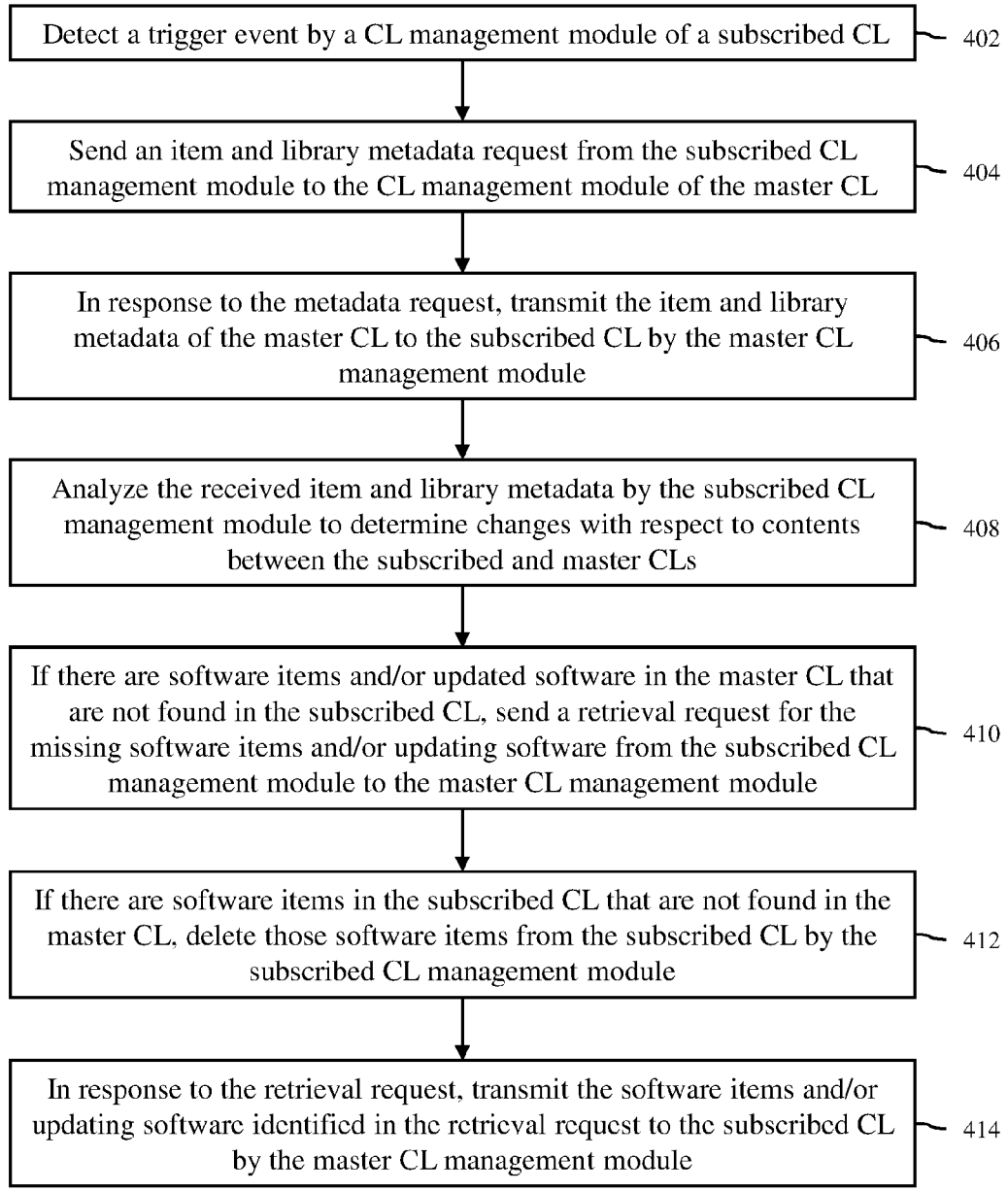
FIG. 4 is a flow diagram of a "pull" synchronization process for a content library that is subscribed to a master content library and does not belong to the replication group of the master content library in accordance with an embodiment of the invention.

A "pull" synchronization process for a content library that is subscribed to a master content library and does not belong to the replication group of the master content library is now described with reference to a flow diagram of FIG. 4. At block 402, a trigger event is detected by a content library management module of the subscribed content library, e.g., the content library management module of the subscribed content library 110-5. This content library management module will be referred to herein as the subscribed content library management module. The trigger event may be an expiration of a recurring time period, e.g., 1 day or 1 week, usage of one or more consumable items in the subscribed content library, a synchronization request from a user of the subscribed content library, or other event that signals the subscribed content library management module to synchronize the contents of the subscribed content library to the contents of the master content library. Next, at block 404, an item and library metadata request is sent from the subscribed content library management module to the content library management module of the master content library, such as the content library management module of the master content library 110-1, in response to the trigger event detection. The content library management module of the master content library will be referred to herein as the master content library management module. In an embodiment, the item metadata request may be an HTTP (Hypertext Transfer Protocol) request.

Next, at block 406, in response to the metadata request, the item and library metadata of the master content library is transmitted to the subscribed content library by the master content library management module. Next, at block 408, the received item and library metadata is analyzed by the subscribed content library management module to determine changes with respect to contents between the subscribed and master content libraries. In particular, the subscribed content library management module determines which software items have been added to or deleted from the master content library since the previous synchronization process. The subscribed content library management module may also determine which software items in the master content library, if any, have been changed/updated to different versions.

Next, at block 410, if there are software items and/or updated software items in the master content library that are not found in the subscribed content library, a retrieval request for the missing software items and/or updating software, e.g., software patches, is sent from the subscribed content library management module to the master content library management module.

Next, at block 412, if there are software items in the subscribed content library that are not found in the master content library, those software items are deleted from the subscribed content library by the subscribed content library management module.

Next, at block 414, in response to the retrieval request, the software items and/or updating software identified in the retrieval request are transmitted to the subscribed content library by the master content library management module. These software items may include new and/or updated software items in the master content library. Thus, outdated software items in the subscribed content library may be replaced by the updated software items from the master content library and missing software items in the subscribed content library are added to the subscribed content library by the new software items from the master content library. In addition, some software items in the subscribed content library may be updated using the updating software. The final result of this process is that the contents of the subscribed content library are now synchronized to the contents of the master content library.

Figure 5A:
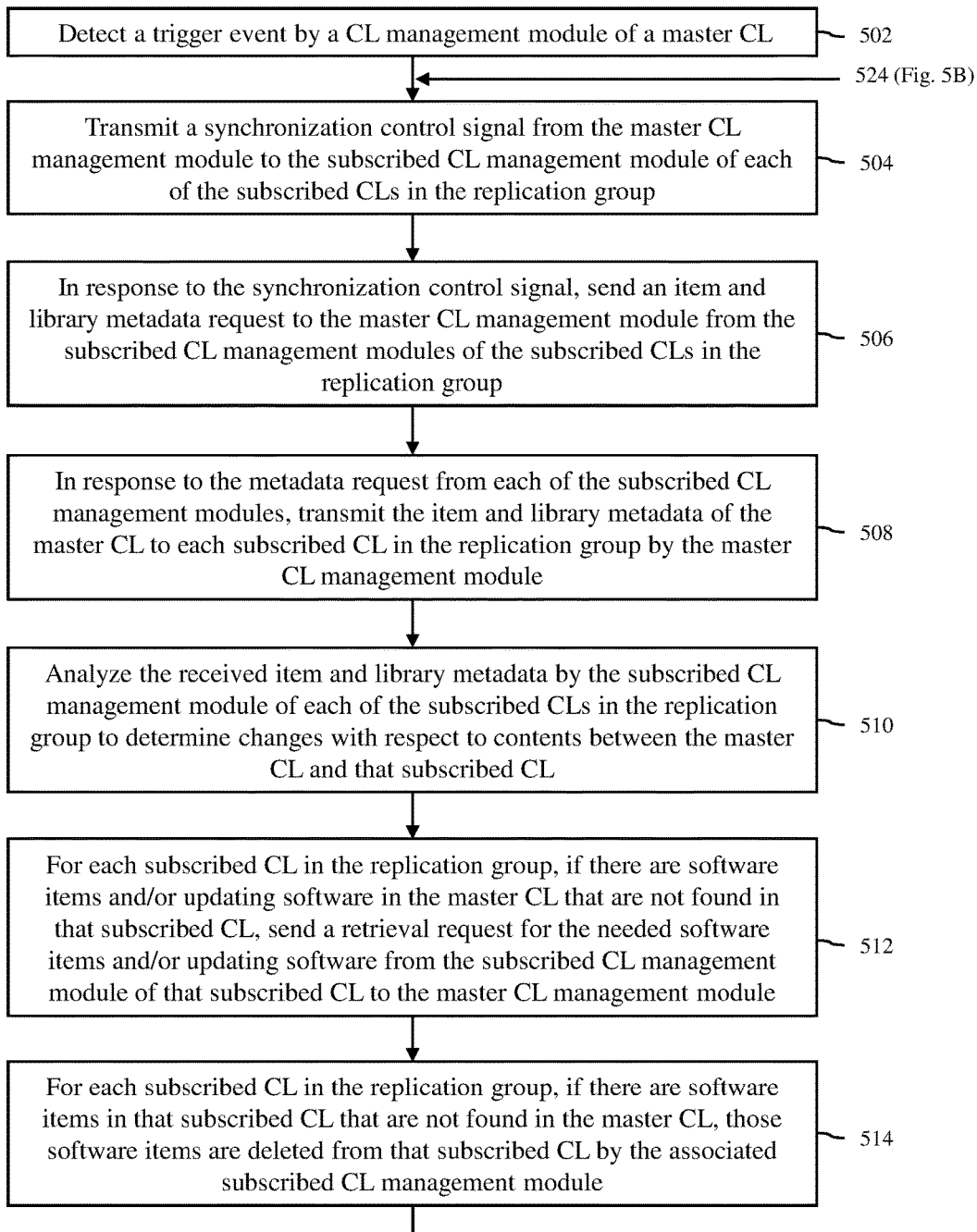

A "push" synchronization process for one or more content libraries that are subscribed to a master content library and belong to the replication group of the master content library is now described with reference to a flow diagram of FIGS. 5A and 5B. At block 502, a trigger event is detected by the master content library management module, e.g., the content library management module of the master content library 110-1. The trigger event may be an expiration of a recurring time period, e.g., 1 day or 1 week, usage of one or more consumable items in the master content library, a synchronization request from a user of the master content library, or other event that signals the master content library management module to synchronize the contents of the subscribed content libraries in the replication group to the contents of the master content library. As an example, the trigger event may be a synchronization request to the master content library management module after an addition to or update of a software item in the master content library, such as a critical patch software for an application.

Next, at block 504, a synchronization control signal is transmitted from the master content library management module to the subscribed content library management module of each of the subscribed content libraries in the replication group to initiate a synchronization process in response to the trigger event detection. In an embodiment, the master content library management uses the replication group data to transmit the synchronization control signal to the appropriate content library management modules.

Next, at block 506, in response to the synchronization control signal from the master content library management module, an item and library metadata request is sent from the subscribed content library management module of each of the subscribed content libraries in the replication group to the master content library management module. In an embodiment, the metadata request may be an HTTP (Hypertext Transfer Protocol) request.

Next, at block 508, in response to the metadata request from each of the subscribed content library management modules of the subscribed content libraries in the replication group, the item and library metadata of the master content library is transmitted to each subscribed content library in the replication group by the master content library management module. In some embodiments, the master content library management module may transmit the item and library metadata to each subscribed content library in the replication group without waiting for the metadata requests. In these embodiments, block 506 is not needed.

Next, at block 510, the received item and library metadata is analyzed by the subscribed content library management module of each of the subscribed content libraries in the replication group to determine changes with respect to contents between the master content library and that subscribed content library. In particular, the subscribed content library management module determines which software items have been added to or deleted from the master content library since the previous synchronization process. The subscribed content library management module may also determine which software items in the master content library, if any, have been changed/updated to different versions.

Next, at block 512, for each subscribed content library in the replication group, if there are software items and/or updated software items in the master content library that are not found in that subscribed content library, a retrieval request for the needed software items and/or updating software is sent from the subscribed content library management module of that subscribed content library to the master content library management module.

Next, at block 514, for each subscribed content library in the replication group, if there are software items in that subscribed content library that are not found in the master content library, those software items are deleted from that subscribed content library by the associated subscribed content library management module.

Next, at block 516, in response to each retrieval request from the subscribed content library management modules, the software items and/or updating software identified in the retrieval request are transmitted to the corresponding subscribed content library (i.e., the subscribed content library associated with the subscribed content library management module that sent the retrieval request) by the master content library management module. These software items may include new and/or updated software items in the master content library. Thus, outdated software items in the subscribed content library are replaced by the updated software items from the master content library and missing software items in the subscribed content library are added to the subscribed content library by the new software items from the master content library.

Next, at block 518, a determination is made by each subscribed content library management module whether all the software items and/or updating software identified in the respective retrieval request have been properly downloaded. If all the updated and/or software items have been properly downloaded for a subscribed content library, then the process proceeds to block 520, where a confirmation signal is transmitted to the master content library management module from the subscribed content library management module of that subscribed content library to inform the master content library management module that the synchronization process has been successful for that particular subscribed content library. The process then comes to an end. However, if all the updated and/or software items have not been properly downloaded for a subscribed content library, then the process proceeds to block 522, where a failed signal is transmitted to the master content library management module from the subscribed content library management module of that subscribed content library to inform the master content library management module that the synchronization process has not been successful for that particular subscribed content library. In some embodiments in which API is used by the master content library management module to interface with the subscribed content library management modules, the master content library management module may monitor the downloading processes, and thus, would know if there are any errors in the downloading processes. In these embodiments, blocks 520 and 522 are not necessary.

Next, at block 524, if a failed message is received from any of the subscribed content library management modules, a determination is made by the master content library management module whether to reattempt to synchronize the "failed" subscribed content libraries with the master content library. This determination may be based on how many reattempts that have already been performed. If reattempt should not to be made, then the process proceeds to block 526, where an error message can be presented to the user of the master content library. The process then comes to an end.

However, if reattempt should to be made, the process proceeds back to block 504, where a synchronization control signal is transmitted from the master content library management module to the subscribed content library management module of each "failed" subscribed content library in the replication group to reattempt the synchronization process. Thus, after the initial synchronization attempt, the synchronization control signal is transmitted only to the subscribed content library management modules of the "failed" subscribed content libraries. The process then continues until all the subscribed content libraries have been properly synchronized or until a predefined number of reattempts have been performed. A successful execution of this process results in the contents of the subscribed content libraries in a replication group being synchronized with the contents of the master content library in that replication group. In some implementations, the process may come to an end without any reattempt to properly download the contents of the master content library.

Thus, replication groups of content libraries can be used to ensure that subscribed content libraries in the replication groups are synchronized with the master content libraries in the same replication groups. Thus, an administrator of a replication group has more control over the content libraries in the replication group. In addition, since identifications of the content libraries in a replication group is maintained, an administrator of the replication group can easily communicate with administrators of the content libraries in the replication group to exchange information related to the replication group. For example, if a master content library is deleted, identifications of subscribers can be used to notify these affected subscribers. As another example, this information gives more control to administer critical software patches. Use of a replication group also simplifies management since management of the replication group can be accomplished from one portal.

In some embodiments, the distributed computer system 100 may allow subscribed content libraries to belong to more than one replication groups. Thus, rather than maintaining multiple subscribed content libraries at a particular site for multiple replication groups, only one subscribed content library can be maintained at the particular site and have contents that are synchronized to multiple master content libraries. As described in detail below, this feature not only simplifies content management at the particular site, but can also reduce the amount of overall content that is stored for that particular site.

Figure 6:
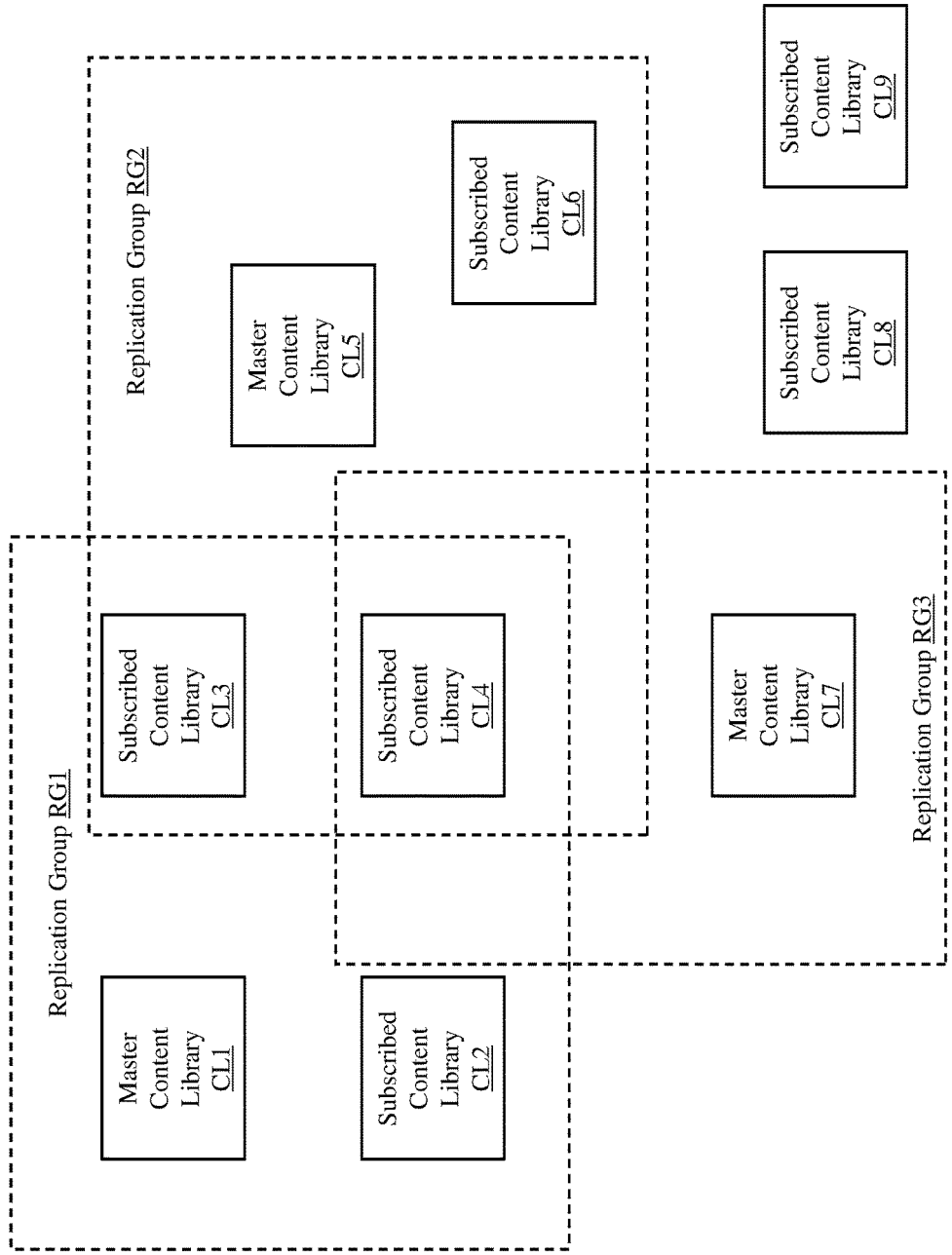
FIG. 6 is an illustration of multiple replication groups in a distributed computer system in accordance with an embodiment of the invention.

Turning now to FIG. 6, an example of multiple replication groups in the distributed computer system 100 in which at least some of the subscribed content libraries belong to more than one replication groups is illustrated. In this example, the distributed computer system includes nine content libraries CL1, CL2, CL3, CL4, CL5, CL6, CL7, CL8 and CL9. The associated content library management modules of these content libraries that perform operations for the respective content libraries are not illustrated in FIG. 6. It can be assumed that actions of a content library described herein with respect to content synchronization are performed or managed by the content library management module associated with that content library for that content library.

In the illustrated example, there are three replication groups RG1, RG2 and RG3. The content libraries CL1, CL2, CL3 and CL4 belong to the replication group RG1 in which the content library CL1 is the master content library and the content libraries CL2, CL3 and CL4 are the subscribed content libraries for this replication group. Thus, the content libraries CL2, CL3 and CL4 are subscribed to the master content library CL1. The content libraries CL3, CL4, CL5 and CL6 belong to the replication group RG2 in which the content library CL5 is the master content library and the content libraries CL3, CL4 and CL6 are the subscribed content libraries for this replication group. Thus, the content libraries CL3, CL4 and CL6 are subscribed to the master content library CL5. The content libraries CL4 and CL7 belong to the replication group RG3 in which the content library CL7 is the master content library and the content library CL4 is the subscribed content library for this replication group. Thus, the content library CL4 is subscribed to the master content library CL7. The content library CL8 does not belong to any replication group, but is subscribed to the master content library CL1. The content library CL9 also does not belong to any replication group, but is subscribed to the master content libraries CL1 and CL5. The relationships between the various content libraries and replication groups and the characteristics of these content libraries are summarized in the table below.

| Content Library | Replication Group | Belong to Multiple Replication Group? | Master or Subscribed? | Subscribed to: |
|---|---|---|---|---|
| CL1 | RG1 | No | Master | N/A |
| CL2 | RG1 | No | Subscribed | CL1 |
| CL3 | RG1, RG2 | Yes | Subscribed | CL1, CL5 |
| CL4 | RG1, RG2, RG3 | Yes | Subscribed | CL1, CL5, CL7 |
| CL5 | RG2 | No | Master | N/A |
| CL6 | RG2 | No | Subscribed | CL5 |
| CL7 | RG3 | No | Master | N/A |
| CL8 | None | No | Subscribed | CL1 |
| CL9 | None | No | Subscribed | CL1, CL5 |

As shown in the above table, the subscribed content libraries CL2 and CL8 are subscribed to only one master content library. Thus, the content library CL2 maintains the same contents as its master content library CL1, and the content library CL8 also maintains the same contents as its master content library CL1. However, the content library CL2 belongs to a replication group, i.e., the replication group RG1, while the content library CL8 does not. The synchronization process for the content library CL8 is same as the synchronization process described above with reference to the flow diagram of FIG. 4 for a content library that is subscribed to a master content library and does not belong to a replication group of the master content library. The synchronization process for the content library CL2 is same as the synchronization process described above with reference to the flow diagram of FIGS. 5A and 5B for one or more content libraries that are subscribed to a master content library and belong to a replication group of the master content library. However, the synchronization process for the CL3, CL4 and CL9, which are subscribed to more than one master content libraries, is different than the synchronization process for the subscribed content libraries that are subscribed to only one master content library. For these subscribed content libraries, each content library maintains the same contents as its master content libraries, which may include one or more duplicate consumable software items, e.g., two master content libraries may have the same consumable software item.

For these subscribed content libraries, the synchronization process involves updating contents in its content library based on the contents of the master content library to which that subscribed content library is being synchronized, while considering the contents of the other master content library or libraries to which that subscribed content library is also subscribed. Thus, if a software content is to be added to a subscribed content library due to the addition of that software content to a first master content library to which the subscribed content library is subscribed, that software content is added or downloaded to that subscribed content library only if the software content is not found in any other master content library to which the subscribed content library is also subscribed. Similarly, if a software content is to be updated or changed to a different version in a subscribed content library due to the update or change of that software content in a first master content library to which the subscribed content library is subscribed, that software content is updated or changed in that subscribed content library only if the updated or changed software content is not found in any other master content library to which the subscribed content library is also subscribed. Furthermore, if a software content is to be deleted from a subscribed content library due to the deletion of that software content from a first master content library to which the subscribed content library is subscribed, that software content is deleted from the subscribed content library only if the software content is not found in any other master content library to which the subscribed content library is also subscribed. Thus, no duplicate software items are stored in a subscribed content library that is subscribed to multiple master content libraries, which may be members of different replication groups. This allows the subscribed content library to be synchronized to multiple content libraries without using excess storage space.

The synchronization process for a subscribed content library that is subscribed to multiple master content libraries depends on whether the subscribed content library and the master content library to which the subscribed content library is to be synchronized belong to the same replication group. If the subscribed content library and the master content library do not belong to the same replication group, then a "pull" synchronization process is performed by the subscribed content library. However, if the subscribed content library and the master content library do belong to the same replication group, then a "push" synchronization process is performed by the master content library. In either of these synchronization processes, the contents of the other master content libraries are considered when deciding to add, update or delete any software items for the subscribed content library, as explained below.

Figure 7:
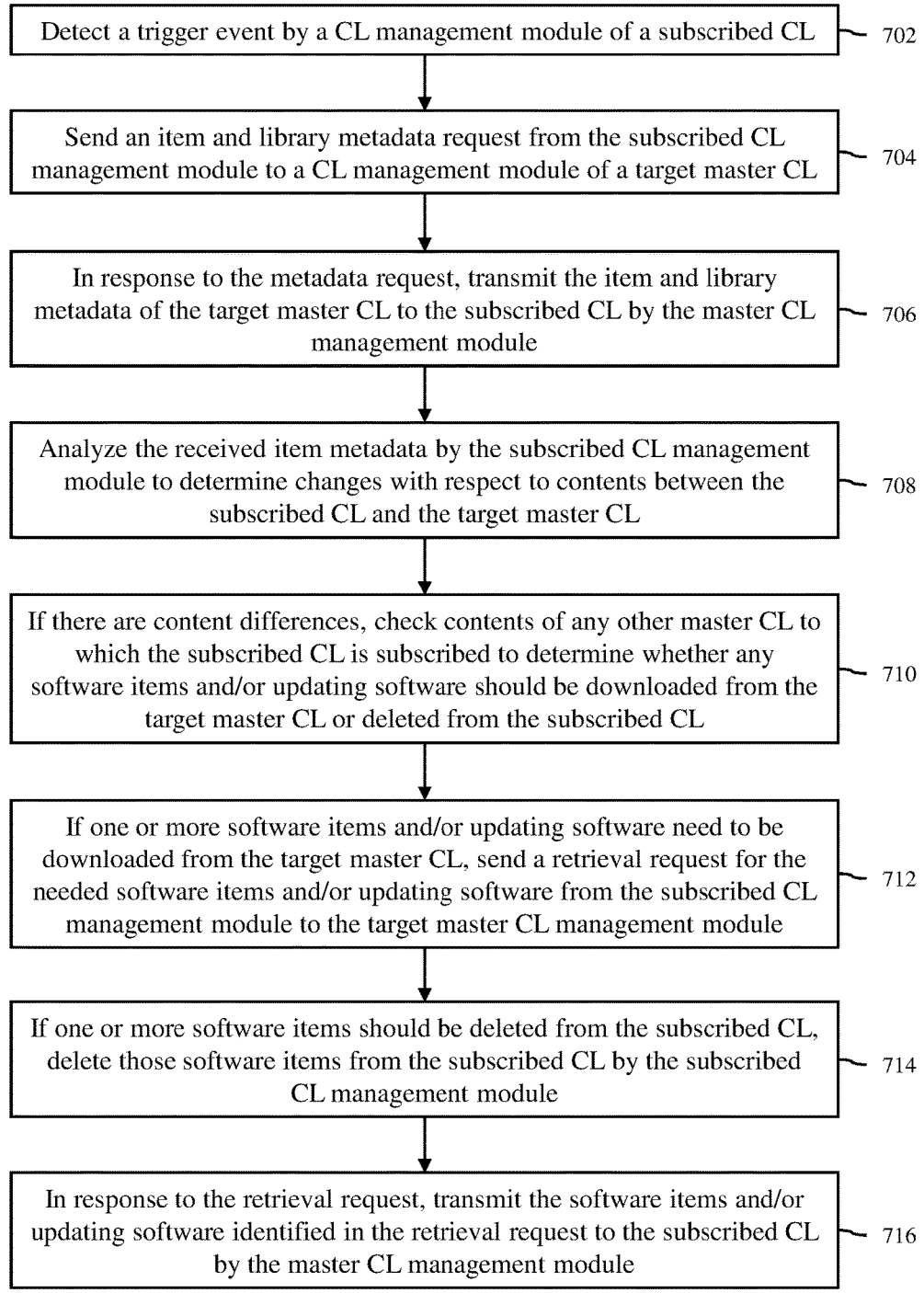
FIG. 7 is a flow diagram of a "pull" synchronization process for a content library that is subscribed to multiple master content libraries and does not belong to the replication group of a source master content library to which the subscribed content library is being synchronized in accordance with an embodiment of the invention.

A "pull" synchronization process for a content library that is subscribed to multiple master content libraries and does not belong to the replication group of a source master content library to which the subscribed content library is being synchronized is now described with reference to a flow diagram of FIG. 7. This process will be described using an example where the content library CL9 depicted in FIG. 6 is being synchronized to the source master content library CL1. At block 702, a trigger event is detected by a content library management module of the subscribed content library, e.g., the content library management module of the subscribed content library CL9. This content library management module will be referred to herein as the subscribed content library management module. The trigger event may be an expiration of a recurring time period, e.g., 1 day or 1 week, usage of one or more consumable items in the subscribed content library, a synchronization request from a user of the subscribed content library, or other event that signals the subscribed content library management module to synchronize the contents of the associated subscribed content library to the contents of its master content library.

Next, at block 704, an item and library metadata request is sent from the subscribed content library management module to the content library management module of the source master content library to which the subscribed content library is being synchronized, e.g., the content library management module of the master content library CL1. The content library management module of the source master content library to which the subscribed content library is being synchronized will be referred to herein as the master content library management module. In an embodiment, the item metadata request may be an HTTP (Hypertext Transfer Protocol) request.

Next, at block 706, in response to the item metadata request, the item and library metadata of the source master content library is transmitted to the subscribed content library by the master content library management module. Next, at block 708, the received item and library metadata is analyzed by the subscribed content library management module to determine changes with respect to contents between the subscribed content library and the source master content library. In particular, the subscribed content library management module determines which software items have been added to or deleted from the master content library since the previous synchronization process. The subscribed content library management module may also determine which software items in the master content library, if any, have been updated to different versions.

Next, at optional block 710, if there are content differences between the subscribed content library and the source master content library, contents of any other master CL to which the subscribed CL is subscribed are checked using item and library metadata already stored in the subscribed CL to determine whether any software items and/or updating software associated with the content differences should be downloaded from the source master content library or deleted from the subscribed content library.

For example, if the content differences between the subscribed and master content libraries include a new software item found only in the source master content library, that software item is checked with the item metadata for each of the other master content libraries to which the subscribed content library is subscribed to determine whether that new software item is in the other master content library. If the new software item is found in any of the other master content libraries, then the new software item is already in the subscribed content library and does not have to be downloaded from the source master content library. However, if the new software item is not found in any of the other master content libraries, then the new software item is not already in the subscribed content library and has to be downloaded from the source master content library. This checking process is also performed if any new updated software item is found in the master content library.

As another example, if the content differences between the subscribed content library and the source master content library include the deletion of a software item from the source master content library since the previous synchronization process, that software item is checked with the item metadata for each of the other master content libraries to which the subscribed content library is subscribed to determine whether that deleted software item is in the other master content libraries. If the deleted software item is found in any of the other master content libraries, then the deleted software item is still needed in the subscribed content library and does not have to be deleted from the subscribed content library. However, if the deleted software item is not found in any of the other master content libraries, then the deleted software item is not needed in the subscribed content library and can be deleted from the subscribed content library.

Next, at block 712, if one or more software items and/or updating software need to be downloaded from the source master content library, a retrieval request for the needed software items and/or updating software is sent from the subscribed content library management module to the source master content library management module.

Next, at block 714, if one or more software items should be deleted from the subscribed content library after checking the item metadata associated with any other master content libraries to which the subscribed content library is subscribed, those software items are deleted from the subscribed content library by the subscribed content library management module.

Next, at block 716, in response to the retrieval request, the software items and/or updating software identified in the retrieval request are transmitted to the subscribed content library by the master content library management module. These software items may include new and/or updated software items in the source master content library. Thus, outdated software items in the subscribed content library may be replaced by the updated software items from the source master content library and missing software items in the subscribed content library are added to the subscribed content library by the new software items from the source master content library. In addition, some software items in the subscribed content library may be updated using the updating software. The final result of this process is that the contents of the subscribed content library are now synchronized to the contents of the source master content library.

Figure 8A:
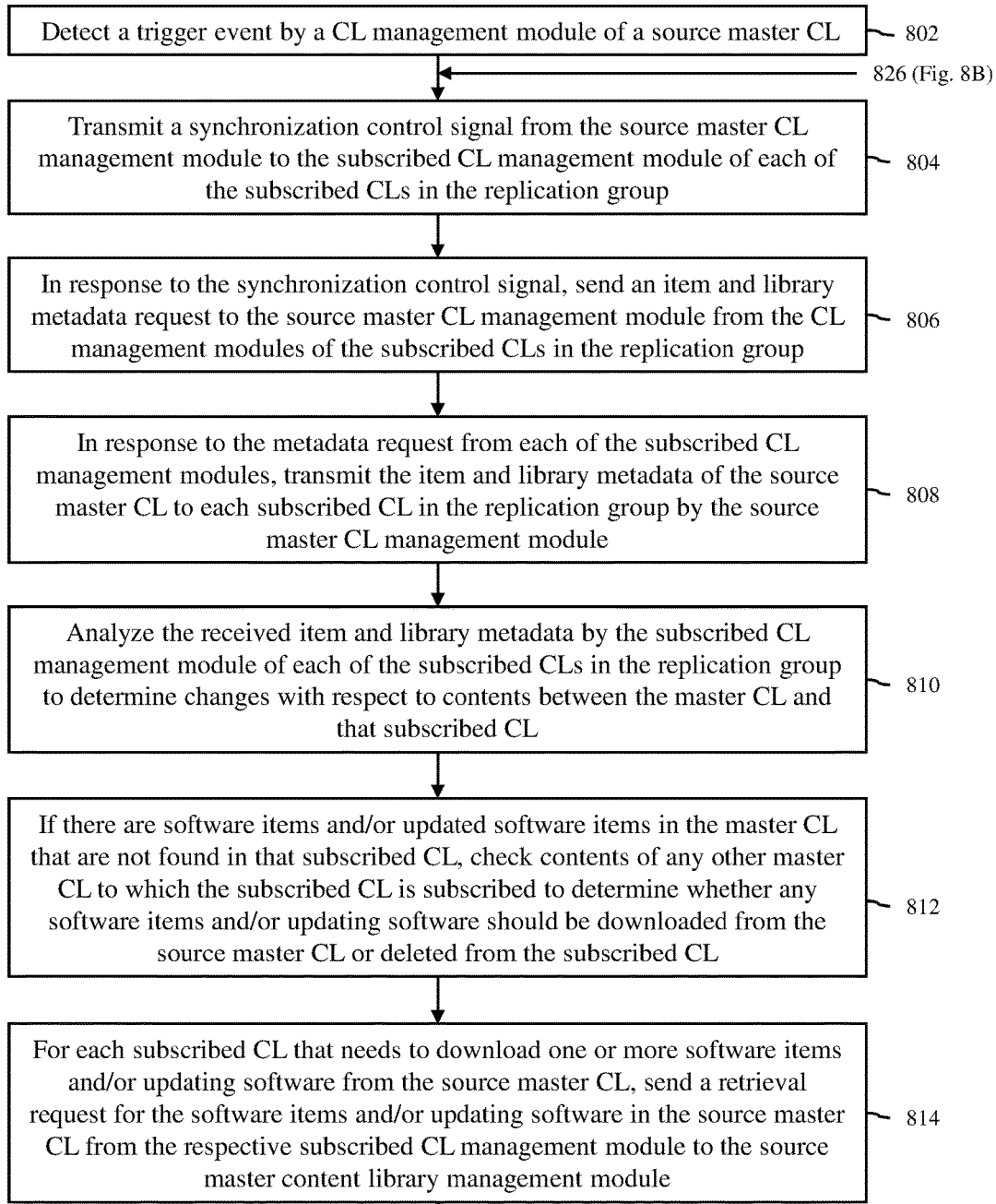
FIGS. 8A and 8B is a flow diagram of a "push" synchronization process for one or more content libraries that are subscribed to a source master content library and belong to the replication group of the source master content library in which at least one of the subscribed content libraries is subscribed to multiple master content libraries in accordance with an embodiment of the invention.
Figure 8B:
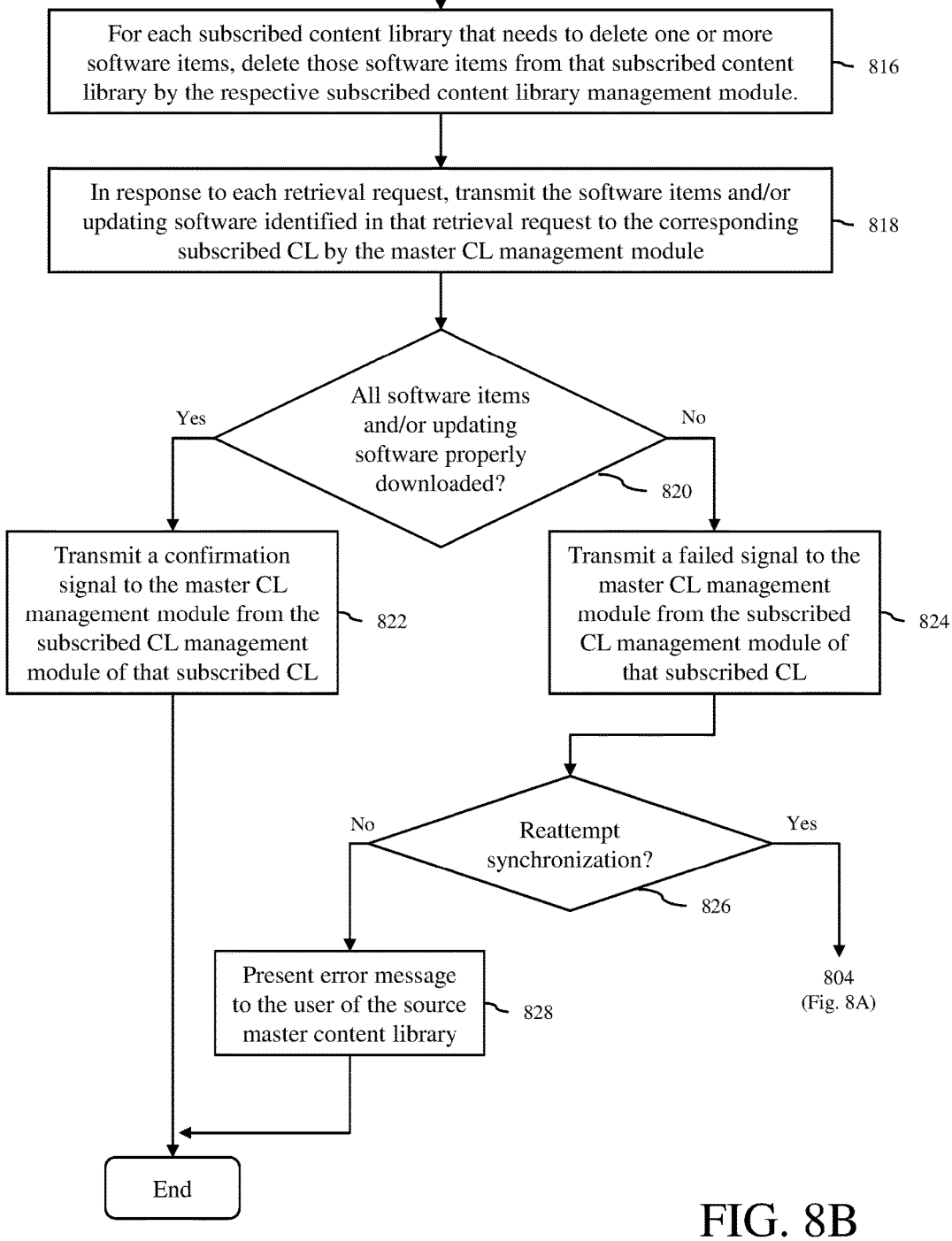

A "push" synchronization process for one or more content libraries that are subscribed to a source master content library and belong to the replication group of the source master content library in which at least one of the subscribed content libraries is subscribed to multiple master content libraries is now described with reference to a flow diagram of FIGS. 8A and 8B. This process will be described using an example where the content libraries CL2, CL3 and CL4 of the replication group RG1 depicted in FIG. 6 are being synchronized to the master content library CL1 of that replication group RG1. At block 802, a trigger event is detected by the master content library management module of the source master content library to which the subscribed content libraries are being synchronized, e.g., by the content library management module of the master content library CL1. The trigger event may be an expiration of a recurring time period, e.g., 1 day or 1 week, usage of one or more consumable items in the master content library, a synchronization request from a user of the master content library, or other event that signals the source master content library management module to synchronize the contents of the subscribed content libraries in the replication group to the contents of the source master content library. As an example, the trigger event may be a synchronization request to the source master content library management module after an addition to or update of a software item in the source master content library, such as a critical patch software for an application.

Next, at block 804, in response to the trigger detection, a synchronization control signal is transmitted from the source master content library management module to each of the subscribed content library management modules in the replication group to initiate a synchronization process. Next, at block 806, in response to the synchronization control signal from the source master content library management module, an item and library metadata request is sent from each of the subscribed content library management modules of the subscribed content libraries in the replication group to the source master content library management module. In an embodiment, the metadata request may be an HTTP (Hypertext Transfer Protocol) request.

Next, at block 808, in response to the metadata request from each of the subscribed content library management modules of the subscribed content libraries in the replication group, the item and library metadata of the source master content library is transmitted to each subscribed content library in the replication group by the source master content library management module. In some embodiments, the source master content library management module may transmit the item and library metadata to each subscribed content library in the replication group without waiting for the item and library metadata requests. In these embodiments, block 806 is not needed.

Next, at block 810, the received item and library metadata is analyzed by each of the subscribed content library management modules of the subscribed content libraries in the replication group to determine changes with respect to contents between the source master content library and the subscribed content library associated with that subscribed content library management module. In particular, the subscribed content library management module determines which software items have been added to or deleted from the source master content library since the previous synchronization process. The subscribed content library management module may also determine which software items in the source master content library, if any, have been updated to different versions. For each subscribed content library in the replication group that is also subscribed to one or more other master content libraries, blocks 812-814 are performed. Otherwise, these blocks are not performed.

At optional block 812, for each subscribed content library in the replication group that is also subscribed to one or more other master content libraries, if there are content differences between that subscribed content library and the master content library, contents of any other master content library to which the subscribed content library is subscribed are checked to determine whether any software items and/or updating software should be downloaded from the source master content library or deleted from the subscribed content library.

For example, if the content differences between the subscribed and master content libraries include a new software item found only in the source master content library, that software item is checked with the item metadata for each of the other master content libraries to which the subscribed content library is subscribed to determine whether that new software item is in the other master content libraries. If the new software item is found in any of the other master content libraries, then the new software item is already in the subscribed content library and does not have to be downloaded from the source master content library. However, if the new software item is not found in any of the other master content libraries, then the new software item is not already in the subscribed content library and has to be downloaded from the source master content library. This checking process is also performed if any new updated software item is found in the source master content library.

As another example, if the content differences between the subscribed and master content libraries include the deletion of a software item from the source master content library since the previous synchronization process, that software item is checked with the item metadata for each of the other master content libraries to which the subscribed content library is subscribed to determine whether that deleted software item is in the other master content libraries. If the deleted software item is found in any of the other master content libraries, then the deleted software item is still needed in the subscribed content library and does not have to be deleted from the subscribed content library. However, if the deleted software item is not found in any of the other master content libraries, then the deleted software item is not needed in the subscribed content library and can be deleted from the subscribed content library.

Next, at block 814, for each subscribed content library that needs to download one or more software items and/or updating software from the master content library, a retrieval request for the software items and/or updating software in the master content library that are not found in that subscribed content library is sent from the respective subscribed content library management module to the source master content library management module.

Next, at block 816, for each subscribed content library that needs to delete one or more software items, those software items are deleted from that subscribed content library by the respective subscribed content library management module.

Next, at block 818, in response to each retrieval request from each of the subscribed content library management modules, the software items and/or updating software identified in that retrieval request are transmitted to the corresponding subscribed content library by the master content library management module. These software items may include new and/or updated software items in the master content library. Thus, outdated software items in the subscribed content library may be replaced by the updated software items from the master content library and missing software items in the subscribed content library are added to the subscribed content library by the new software items from the master content library. In addition, some software items in the subscribed content library may be updated using the updating software.

Next, at block 820, a determination is made by each subscribed content library management module whether all the software items and/or updating software have been properly downloaded. If all the updated and/or software items have been properly downloaded for a subscribed content library, then the process proceeds to block 822, where a confirmation signal is transmitted to the master content library management module from the subscribed content library management module of that subscribed content library to inform the master content library management module that the synchronization process has been successful for that particular subscribed content library. The process then comes to an end. However, if all the updated and/or software items have not been properly downloaded for a subscribed content library, then the proceeds to block 824, where a failed signal is transmitted to the master content library management module from the subscribed content library management module of that subscribed content library to inform the master content library management module that the synchronization process has not been successful for that particular subscribed content library. In some embodiments in which API is used by the master content library management module to interface with the subscribed content library management modules, the master content library management module may monitor the downloading processes, and thus, would know if there are any errors in the downloading processes. In these embodiments, blocks 822 and 824 are not necessary.

Next, at block 826, if a failed message is received from any of the subscribed content library management modules, a determination is made by the master content library management module whether to reattempt to synchronize the "failed" subscribed content libraries with the source master content library. This determination may be based on how many reattempts that have already been performed. If reattempt should not to be made, then the process proceeds to block 828, where an error message can be presented to the user of the source master content library. The process then comes to an end.

However, if reattempt should to be made, the process proceeds back to block 804, where a synchronization control signal is transmitted from the master content library management module to the subscribed content library management module of each "failed" subscribed content library in the replication group to reattempt the synchronization process. Thus, after the initial synchronization attempt, the synchronization control signal is transmitted only to the subscribed content library management modules of the "failed" subscribed content libraries. The process then continues until all the subscribed content libraries have been properly synchronized or until a predefined number of reattempts have been performed. A successful execution of this process results in the contents of the subscribed content libraries in a replication group being synchronized with the contents of the source master content library in that replication group. In some implementations, the process may come to an end without any reattempt to properly download the contents of the master content library.

Figure 9:
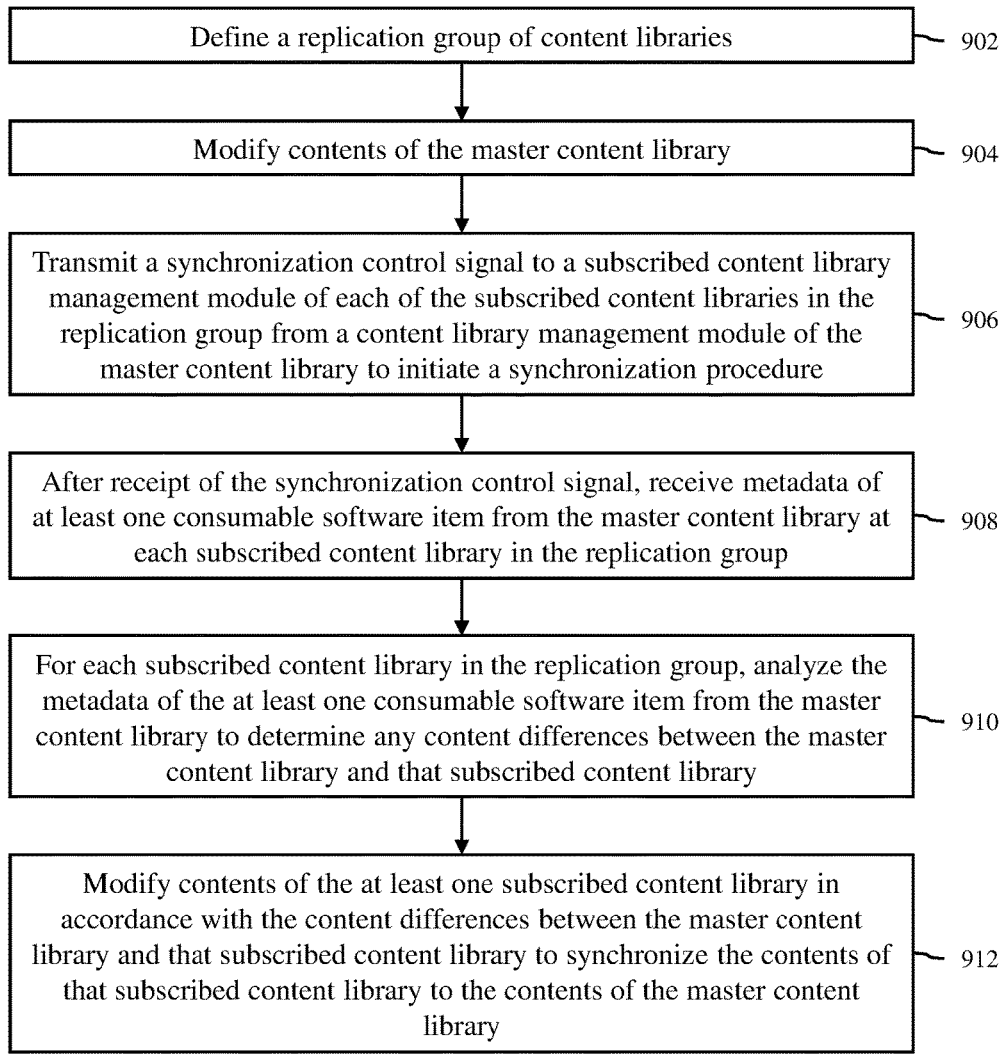
FIG. 9 is a flow diagram of a method for synchronizing content libraries in replication groups within a distributed computer system in accordance with an embodiment of the invention.

A method for synchronizing content libraries in replication groups within a distributed computer system in accordance with an embodiment of the invention is described with reference to a flow diagram of FIG. 9. At block 902, a replication group of content libraries is defined. The replication group includes a master content library and at least one subscribed content library. At block 904, contents of the master content library are modified. The master content library includes at least one consumable software item and metadata of the at least one consumable software item. At block 906, a synchronization control signal is transmitted to a subscribed content library management module of each subscribed content library in the replication group from a content library management module of the master content library to initiate a synchronization procedure. At block 908, after receipt of the synchronization control signal, the metadata of the at least one consumable software item from the master content library is received at each subscribed content library in the replication group. At block 910, for each subscribed content library in the replication group, the metadata of the at least one consumable software item from the master content library is analyzed to determine any content differences between the master content library and that subscribed content library. At block 912, contents of the at least one subscribed content library are modified in accordance with the content differences between the master content library and that subscribed content library to synchronize the contents of that subscribed content library to the contents of the master content library.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for synchronizing content libraries in replication groups within a distributed computer system, the method comprising:
    defining a replication group of content libraries, the replication group including a master content library and at least one subscribed content library, wherein the master content library is associated with another subscribed content library that does not belong to the replication group;
    modifying contents of the master content library, the master content library including at least one consumable software item and metadata of the at least one consumable software item;
    detecting a trigger event by the master content library;
    in response to detecting the trigger event, transmitting, from a content library management module of the master content library, a synchronization control signal to a subscribed content library management module of each subscribed content library in the replication group to initiate a synchronization procedure;
    after receipt of the synchronization control signal, receiving the metadata of the at least one consumable software item from the master content library at each subscribed content library in the replication group;
    for each subscribed content library in the replication group, analyzing the metadata of the at least one consumable software item from the master content library to determine any content differences between the master content library and that subscribed content library;
    modifying contents of the at least one subscribed content library in accordance with the content differences between the master content library and that subscribed content library to synchronize the contents of that subscribed content library to the contents of the master content library, and for the another subscribed content library that does not belong to the replication group, executing a synchronization process to synchronize the contents of the another subscribed content library to the contents of the master content library only when initiated by the another subscribed content library.

2. The method of claim 1, further comprising maintaining identification of each subscribed content library that can be accessed by the master content library management module.

3. The method of claim 1, wherein modifying the contents of the at least one subscribed content library includes downloading a first consumable software item that is not found in a particular subscribed content library in the replication group from the master content library to the particular subscribed content library.

4. The method of claim 3, wherein modifying the contents of the at least one subscribed content library further includes deleting a second consumable software item that is not found in the master content library from the particular subscribed content library.

5. The method of claim 1, further comprising:
receiving another synchronization control signal at the content library management module of the master content library from another subscribed content library management module of the another subscribed content library that is not in the replication group to initiate another synchronization procedure;
after receipt of the another synchronization control signal at the content library management module of the master content library, transmitting the metadata of the at least one consumable software item to the another subscribed content library from the master content library;
analyzing the metadata of the at least one consumable software item from the master content library to determine any content differences between the master content library and the another subscribed content library; and
modifying contents of the another subscribed content library in accordance with the content differences between the master content library and the another subscribed content library to synchronize the contents of the another subscribed content library to the contents of the master content library.

6. The method of claim 1, wherein the at least one consumable software item is stored in the master content library as Open Virtualization Format (OVF) file format.

7. The method of claim 1, wherein the metadata of the at least one consumable software item is stored in the master content library and the at least one subscribed content library as one or more JavaScript Object Notation (JSON) files.

8. A non-transitory computer-readable storage medium containing program instructions for synchronizing content libraries in replication groups within a distributed computer system, wherein execution of the program instructions by one or more processors of a computer system causes the one or more processors to perform steps comprising:
defining a replication group of content libraries, the replication group including a master content library and at least one subscribed content library, wherein the master content library is associated with another subscribed content library that does not belong to the replication group;
modifying contents of the master content library, the master content library including at least one consumable software item and metadata of the at least one consumable software item;
detecting a trigger event by the master content library;
in response to detecting the trigger event, transmitting, from a content library management module of the master content library, a synchronization control signal to a subscribed content library management module of each subscribed content library in the replication group to initiate a synchronization procedure;
after receipt of the synchronization control signal, receiving the metadata of the at least one consumable software item from the master content library at each subscribed content library in the replication group;
for each subscribed content library in the replication group, analyzing the metadata of the at least one consumable software item from the master content library to determine any content differences between the master content library and that subscribed content library;
modifying contents of the at least one subscribed content library in accordance with the content differences between the master content library and that subscribed content library to synchronize the contents of that subscribed content library to the contents of the master content library, and
for the another subscribed content library that does not belong to the replication group, executing a synchronization process to synchronize the contents of the another subscribed content library to the contents of the master content library only when initiated by the another subscribed content library.

9. The computer-readable storage medium of claim 8, wherein the steps further comprise maintaining identification of each subscribed content library that can be accessed by the master content library management module.

10. The computer-readable storage medium of claim 8, wherein modifying the contents of the at least one subscribed content library includes downloading a first consumable software item that is not found in a particular subscribed content library in the replication group from the master content library to the particular subscribed content library.

11. The computer-readable storage medium of claim 10, wherein modifying the contents of the at least one subscribed content library further includes deleting a second consumable software item that is not found in the master content library from the particular subscribed content library.

12. The computer-readable storage medium of claim 8, wherein the steps further comprise:
receiving another synchronization control signal at the content library management module of the master content library from another subscribed content library management module of the another subscribed content library that is not in the replication group to initiate another synchronization procedure;
after receipt of the another synchronization control signal at the content library management module of the master content library, transmitting the metadata of the at least one consumable software item to the another subscribed content library from the master content library;
analyzing the metadata of the at least one consumable software item from the master content library to determine any content differences between the master content library and the another subscribed content library; and modifying contents of the another subscribed content library in accordance with the content differences between the master content library and the another subscribed content library to synchronize the contents of the another subscribed content library to the contents of the master content library.

13. The computer-readable storage medium of claim 8, wherein the at least one consumable software item is stored in the master content library as Open Virtualization Format (OVF) file format.

14. The computer-readable storage medium of claim 8, wherein the metadata of the at least one consumable software item is stored in the master content library and the at least one subscribed content library as one or more JavaScript Object Notation (JSON) files.

15. A distributed computer system comprising:
memory;
at least one processor that is configured to:
define a replication group of content libraries, the replication group including a master content library and at least one subscribed content library, wherein the master content library is associated with another subscribed content library that does not belong to the replication;
modify contents of the master content library, the master content library including at least one consumable software item and metadata of the at least one consumable software item;
detect a trigger event by the master content library;
in response to detecting the trigger event, transmit, from a content library management module of the master content library, a synchronization control signal to a subscribed content library management module of each subscribed content library in the replication group to initiate a synchronization procedure;
after receipt of the synchronization control signal, receive the metadata of the at least one consumable software item from the master content library at each subscribed content library in the replication group;
for each subscribed content library in the replication group, analyze the metadata of the at least one consumable software item from the master content library to determine any content differences between the master content library and that subscribed content library;
modify contents of the at least one subscribed content library in accordance with the content differences between the master content library and that subscribed content library to synchronize the contents of that subscribed content library to the contents of the master content library; and for the another subscribed content library that does not belong to the replication group, execute a synchronization process to synchronize the contents of the another subscribed content library to the contents of the master content library only when initiated by the another subscribed content library.

16. The distributed computer system of claim 15, wherein the at least one processor is further configured to maintain identification of each subscribed content library that can be accessed by the master content library management module.

17. The distributed computer system of claim 15, wherein the at least one processor is further configured to download a first consumable software item that is not found in a particular subscribed content library in the replication group from the master content library to the particular subscribed content library.

18. The distributed computer system of claim 17, wherein the at least one processor is further configured to delete a second consumable software item that is not found in the master content library from the particular subscribed content library.

19. The distributed computer system of claim 15, wherein the at least one processor is further configured to:
receive another synchronization control signal at the content library management module of the master content library from another subscribed content library management module of the another subscribed content library that is not in the replication group to initiate another synchronization procedure;
after receipt of the another synchronization control signal at the content library management module of the master content library, transmit the metadata of the at least one consumable software item to the another subscribed content library from the master content library;
analyze the metadata of the at least one consumable software item from the master content library to determine any content differences between the master content library and the another subscribed content library; and
modify contents of the another subscribed content library in accordance with the content differences between the master content library and the another subscribed content library to synchronize the contents of the another subscribed content library to the contents of the master content library.

20. The distributed computer system of claim 15, wherein the at least one consumable software item is stored in the master content library as Open Virtualization Format (OVF) file format.

21. The distributed computer system of claim 15, wherein the metadata of the at least one consumable software item is stored in the master content library and the at least one subscribed content library as one or more JavaScript Object Notation (JSON) files.

* * * * *